United States Patent [19]

Roberge

[11] 3,849,606

[45] Nov. 19, 1974

[54] TONE RINGER

[75] Inventor: Kenneth Joseph Roberge, Boulder, Colo.

[73] Assignee: Bell Telephone Laboratories, Incorporated, Murray Hill, N.J.

[22] Filed: June 14, 1973

[21] Appl. No.: 369,937

[52] U.S. Cl. .............................................. 179/84 T
[51] Int. Cl. .......................................... H04m 19/02
[58] Field of Search .......... 179/84 T, 84 R; 331/141

[56] References Cited

UNITED STATES PATENTS

| | | | |
|---|---|---|---|
| 2,759,179 | 8/1956 | Kircher | 179/84 T |
| 3,031,627 | 4/1962 | Reichert et al. | 331/141 |
| 3,772,470 | 11/1973 | Cowpland et al. | 179/84 T |

*Primary Examiner*—Kathleen H. Claffy
*Assistant Examiner*—Gerald L. Brigance
*Attorney, Agent, or Firm*—C. H. Davis

[57] ABSTRACT

A tone ringing generator energized by conventional power ringing currents to provide a series of tone bursts, each of which is immediately preceded by an audible click which improves a listener's ability to locate a telephone set emitting the tone ringing. The generator contains a relaxation oscillator comprising a timing capacitor and resistor which are also common to an audio oscillator. As the capacitor charges, the audio oscillator output to a transducer exponentially decreases. Shortly after the oscillator output has decreased to an inaudible level the capacitor charges to a point to trigger the relaxation oscillator and the capacitor is rapidly discharged over a path including the transducer to produce the click. Immediately upon discharge of the capacitor the audio oscillator again drives the transducer with audio oscillations and the cycle repeats itself.

8 Claims, 2 Drawing Figures

TONE RINGER

BACKGROUND OF THE INVENTION

This invention relates to telephone tone ringers and more particularly to tone ringers the audio output of which are amplitude-modulated.

Advances in electronic technology have made telephone tone ringers practical alternatives to conventional bell ringers and tone ringers provide a signal which is generally considered to be substantially more pleasing to the average ear than the characteristic jangle of a telephone bell. To permit individual telephone subscribers to have a tone ringer, it is well known in the art to provide circuitry which will operate the tone ringer in response to conventional low frequency power ringing signals applied to telephone lines at a central office. In this manner no new equipment or complex changes need be made at central offices to which subscribers having tone ringers are connected. Tone ringers of the prior art utilize a variety of audio oscillators that generate amplitude modulated audio signals. These audio signals provide warbling or other sounds which are distinctive and aid a subscriber in identifying the sound as being tone ringing. Prior art tone ringers have not been used in certain locations, however, such as an office in which several clerical or other employees are accommodated, each having an individual telephone set. In these applications employees have experienced increased difficulty in determining which of a number of telephone sets is emitting tone ringing. Significantly less difficulty is experienced in locating a telephone set emitting bell ringing. This is due to the characteristic of the ringing signal from a bell. The clapper in a bell ringer striking the bell itself creates an audio signal comprising a sharp transient in the form of a "click" immediately followed by a decaying audio oscillation. While the click itself is not specifically noticeable, it is detectable and provides a directionality which allows a listener to quickly identify which of a number of nearby telephones is ringing. Directionality is the characteristic of a signal that enables a person to locate a sound source and is caused by the short time interval between the sound wave of the "click" striking one of a listener's ears and striking the other ear. The same degree of directionality is not provided by a continuous oscillation such as tone ringing. Prior art tone ringing generators generate various audio tone ringing signals but none generates sharp transients in the form of "clicks" as part of the ringing signal to improve the directionality thereof.

In view of the foregoing, it is apparent that a need exists in the art for a tone ringer that can generate a distinctive, pleasant tone ringing signal having a characteristic that improves the directionality of the signal.

SUMMARY OF THE INVENTION

The foregoing need of the tone ringer art is satisfied by an illustrative embodiment of my invention wherein I provided a tone ringer which generates sequential pulses of a distinctive tone ringing signal with each pulse being immediately preceded by an audible "click" as is the ringing signal generated by a conventional bell ringer. Similar to bell ringing this "click" is not specifically noticeable by a listener but provides the desired directionality without detracting from the pleasant sound of the tone ringing. Specifically, my tone ringer includes an audio oscillator and an interconnected relaxation oscillator, the former oscillator being controlled by the latter to generate amplitude modulated pulses at the frequency of operation of the relaxation oscillator. A transducer converts electrical signals generated by the oscillators to audible tone ringing. A timing resistor and capacitor in the relaxation oscillator are interconnected to the audio oscillator to effect the operation thereof. The capacitor charges and discharges and the changing potential thereacross produces pulses which affect the audio oscillator in two ways. These pulses affect the audio oscillator to produce the audio pulses and to cause the amplitude of each pulse to exponentially decrease producing a distinctive, pleasant tone ringing sound. In accordance with a feature of my invention the discharge path of the relaxation oscillator timing capacitor is directly through the tone ringer transducer. The capacitor discharges very rapidly and provides a current pulse that produces the audible "click" immediately preceding each audio pulse. The "clicks" provides the desired directionaltiy to the tone ringing.

Advantageously, my tone ringer may be energized by the ac power ringing pulses conventionally applied to a telephone line to operate a bell ringer. I provide a power supply energized by power ringing that provides power to my tone ringer. My power supply also provides a periodic signal which causes the tone ringing to be interrupted in the same ringing and silent intervals as heard with a bell ringer. Each ringing interval consists of several tone ringing pulses.

BRIEF DESCRIPTION OF THE DRAWING

The above and other features of my invention will be more apparent by reading the following description of an exemplary embodiment thereof in conjunction with the drawing in which.

DETAILED DESCRIPTION

Figure 1:
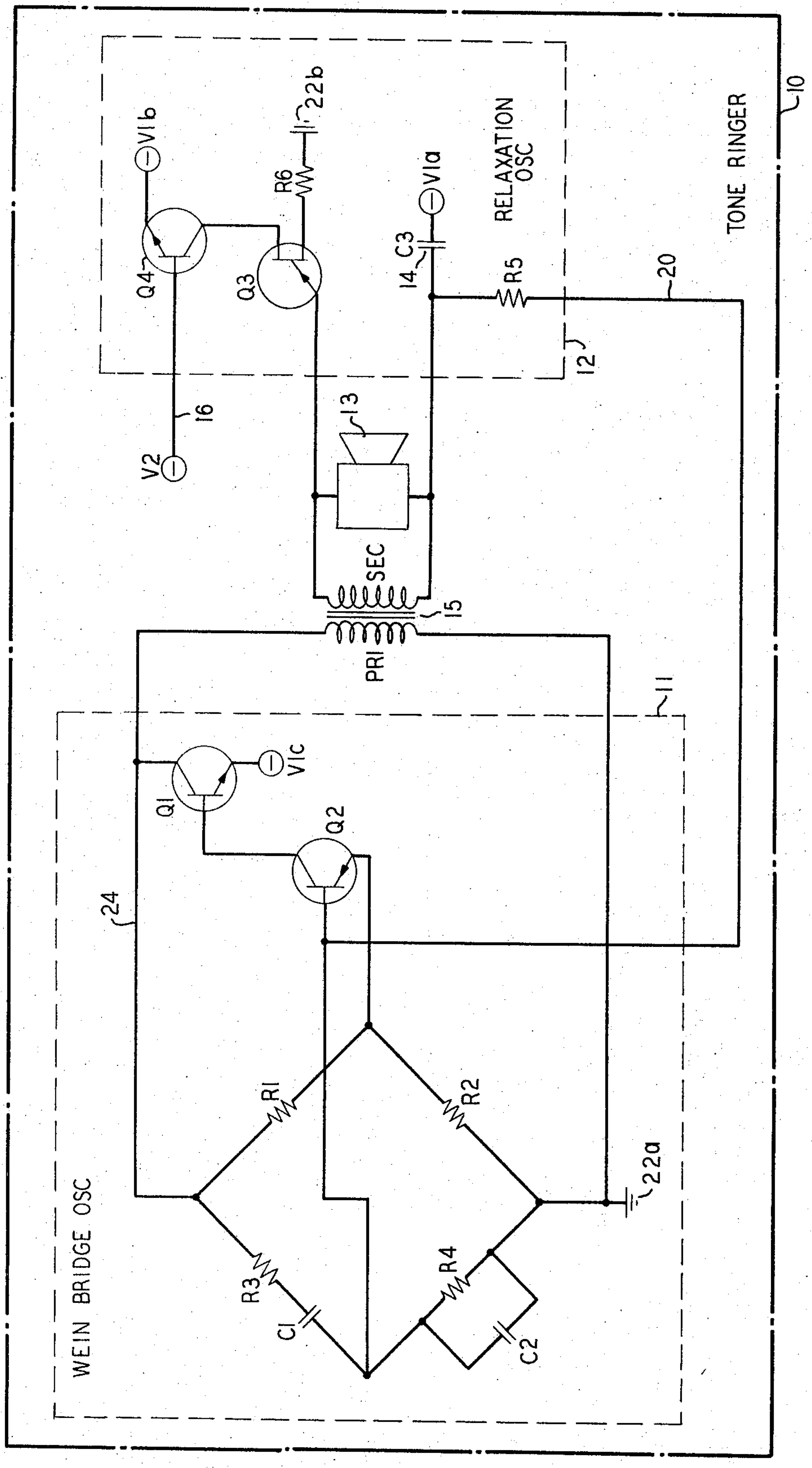
FIG. 1 is a schematic diagram of my tone ringing circuit.

Referring now to FIG. 1, therein is shown one embodiment of my invention in tone ringer 10 which includes a Wein Bridge audio oscillator 11, a relaxation oscillator 12, and a tone ringing transducer 13.

The Wein Bridge oscillator 11 is well known in the art and includes a bridge circuit comprising resistors R1, R2, R3, and R4, and capacitors C1 and C2, and further comprises an amplifier consisting of transistors Q1 and Q2. The signal generated by oscillator 11 is applied to primary winding PR1 of transformer 15 which couples the signal to transducer 13. Transducer 13 may advantageously be a telephone set earpiece. The two-stage amplifier provides the zero phase shift required in order to have positive feedback to sustain oscillation. The feedback is applied via lead 24 to the bridge circuit which determines the frequency of operation of oscillator 11. The bridge circuit has two feedback networks, one regenerative, the other degenerative. The degenerative or negative feedback network comprising resistors R1 and R2 is frequency insensitive and provides oscillator stability. The regenerative or positive feedback network comprising components R3, C1, R4, C2 is frequency sensitive and couples the output of the amplifier back to its input at the base terminal of transistor Q2 to sustain oscillation. At the frequency of oscillation (fo), determined by the values of the components of the bridge, the positive feedback voltage slightly exceeds and is in phase with the negative feedback voltages. With the value of resistance of R3 equal to that of R4 and the value of capacitance of C1 equal to that of C2, the frequency at which the circuit oscillates is determined by the equation $$fo = 1/2\pi \text{ R3 c1}$$

At frequencies above or below frequency fo the negative feedback voltage is greater than the positive feedback voltage and oscillations at these frequencies are suppresssed.

As is well known in the art, in order for a conventional Wein Bridge oscillator to oscillate the Barkhausen criterion must be met. That is, BA must be equal or greater than 1; where A is the gain of the amplifier and B is the feedback factor. When the bridge circuit is balanced the product BA equals zero. To sustain oscillations the bridge must be unbalanced while the difference in phase shift across R3 and C1, and R4 and C2 remains zero. This is achieved by selecting a proper ratio of the resistors of the bridge circuit.

Relaxation oscillator 12 comprises unijunction transistor Q3, resistors R5 and R6, and capacitor C3. Transistor Q4 is a switch for energizing relaxation oscillator 12. In a manner well known in the art, capacitor C3 charges at one rate through resistor R5 until it has a potential thereacross that causes transistor Q3 to conduct and discharge capacitor C3 through transistor Q4 at a much faster rate. Upon the discharge of capacitor C3, transistor Q3 ceases conduction and the capacitor recharges back to the discharge potential. This cycle repeats itself as long as transistor Q4 is maintained in its conducting state by the application of potential V2 via lead 16 to its base terminal.

In accordance with my invention the discharge path of capacitor C3 includes transducer 13 and an audible click is produced by the rapid discharge of the capacitor therethrough. Resistor R5 connects oscillator 12 to oscillator 11 via lead 20 to affect the operation of the latter. As oscillator 12 functions, as described in greater detail hereinafter, it causes the audio frequency output of Wein Bridge oscillator 11 to be interrupted and amplitude modulated, thereby producing a distinctive, pleasant sounding tone ringing signal.

Application of conventional power ringing to a subscriber's telephone line (not shown in FIG. 1) causes potentials V1 *a*, *b*, *c* and V2 to be applied to oscillators 11 and 12 as shown in FIG. 1. The generation of potentials V1 and V2 is described further in the specification. Upon the application of these potentials to oscillators 11 and 12, both oscillators commence functioning. In oscillator 12, capacitor C3 exponentially charges over a path starting at potential V1a and including capacitor C3, resistor R5, lead 20, and resistor R4 to ground potential 22*a*. As capacitor C3 charges, the charging current creates an exponentially changing voltage at the base terminal of transistor Q2 that causes the output of oscillator 11 to exponentially decrease such that the output at the transducer is inaudible before the capacitor is discharged through transistor Q3. The result is a series of oscillation pulses, the amplitude of each pulse exponentially decreasing so as to be inaudible to produce the distinctive pleasant tone ringing sound.

Turning now to the charging, discharging cycle of capacitor C3. The positive terminal 14 of capacitor C3 is connected via transducer 13 and secondary winding SEC of transformer 15 to the emitter terminal of transistor C3. Capacitor C3 charges to a potential that causes unijunction transistor Q3 to break down and capacitor C3 is very rapidly discharged through transducer 13, and transistors Q3 and Q4 to potential V1b. This rapid discharge of capacitor C3 through transducer 13 produces an audible click, similar to that provided by a conventional bell ringer, that provides the desired directionality to the signal from my tone ringer.

Capacitor C3 is substantially discharged before transistor C3 ceases conduction and allows the capacitor to recharge. The drop in potential across capacitor C3 due to its discharge causes oscillator 11 to oscillate again. As capacitor C3 recharges, the output of oscillator 11 again decreases close to zero.

Thus, oscillator 11 is controlled by oscillator 12 to produce a pulse of audio oscillations for each cycle of oscillator 12. Advantageously, each audio frequency pulse follows each discharge of capacitor C3 so transducer 15 produces a click followed immediately by the distinctive audio signal.

Turning now to describe how tone ringer 10 is energized. While only potentials V1 *a*, *b*, *c* are applied to both oscillators 11 and 12, there is no tone ringing output. Oscillator 11 is prevented from oscillating as capacitor C3 in oscillator 12 charges and potential across the capacitor, connected via resistor R5 to transistor Q2, prevents oscillation by preventing transistor Q2 from conducting. Oscillator 12 is also prevented from oscillating because, with potential V2 not being applied to the base terminal of transistor Q4 this transistor cannot conduct and, therefore, transistor Q3 cannot conduct to discharge capacitor C3. To obtain tone ringing potential V2 is applied via lead 16 to the base terminal of transistor Q4 to turn this transistor on. Transistor Q3 can thereby conduct to discharge capacitor C3 and produce the audible click via transducer 13 as previously described. Immediately upon the discharge of capacitor C3 oscillator 11 functions, again as previously described, to produce the distinctive, pleasant tone ringing signal. Potential V2, which is used to energize ringer 10 to get tone ringing output, must also be interrupted in order to provide the ringing and silent intervals such as exist with conventional power ringing.

Figure 2:
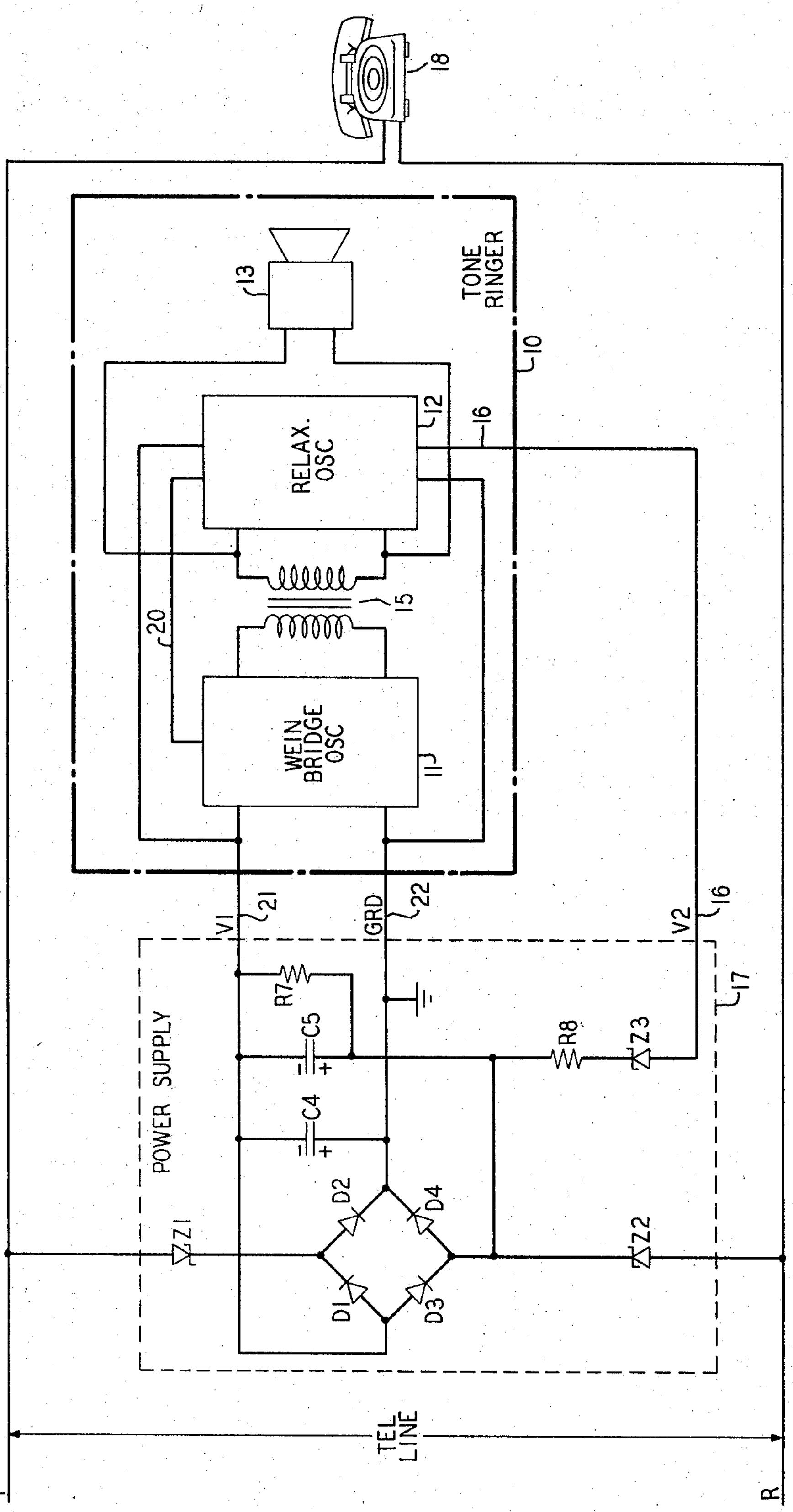
FIG. 2 is a schematic diagram of a power supply energized by conventional power ringing signals applied to a subscriber substation telephone line to provide power for my tone ringing circuit.

In accordance with an aspect of my invention, the arrangement shown in FIG. 2 offers one means of operating tone ringer 10 located at a subscriber telephone set 18. Connected across the telephone line consisting of leads T and R is a power supply 17 which rectifies conventional AC power ringing applied to the telephone line from a central office (not shown). Power supply 17 utilizes zener diodes Z1 and Z2 to input the ac power ringing to the power supply while not affecting subsequent voice signals on telephone line leads T and R. The zener voltage of diodes Z1 and Z2 may advantageously be in the order or 70 volts in order that they will not conduct either for potentials caused by voice signals or for dc supervisory potentials present on leads T and R when it is idle. AC power ringing signals, however, are in the order of 90 to 110 volts and do cause zener diodes Z1 and Z2 to conduct to pass power ringing to power supply 17. A full wave rectifier comprising diodes D1, D2, D3, and D4 rectifies the ringing signal which is then filtered by capacitor C4. Potential V1 is output on lead 21 to tone ringer 10 to supply potentials V1 *a*, *b*, and *c* thereto.

On each negative half cycle of ac power ringing lead T is at a more negative potential than lead R and diode Z1 conducts in its back biased zener direction. Current flows through diodes Z1 and D1, capacitor C4, diode D4, and through diode Z2 in its forward biased direction to lead R. Thus, capacitor C4 charges during each negative half cycle of power ringing. On each positive half cycle of power ringing lead T is at a more positive potential than lead R and diode Z2 conducts in its back biased zener direction. Current flows through diodes Z2 and D3, capacitor C4, diode D2 and through diode Z1 in its forward biased direction. Thus, capacitor C4 charges during each positive half cycle of power ringing. Capacitor C4 filters the full wave rectified power ringing and acts as a battery supplying dc current via lead 21 and 22 to tone ringer 10.

As previously described, tone ringer 10 has to be activated by applying a potential V2 to lead 16. In addition potential V2 is periodically interrupted to provide the necessary ringing signal interruptions. This is provided as now described. During each negative half cycle of power ringing capacitor C5 is charged by current flowing over a path through diodes Z1 and D1, capacitor C5 and diode Z2. Capacitor C5 is not charged during positive half cycles of power ringing as there is no complete path for current flow. Capacitor C5 filters the half wave rectified power ringing applied to it and acts as a battery supplying a dc potential V2 via resistor R8, zener diode Z3, and lead 16 to activate tone ringer 10. When power ringing is interrupted capacitor C5 discharges fairly rapidly through resistor R7 causing potential V2 to be interrupted in direct correspondence with interruptions in the power ringing signal. The time constant of capacitor C5 and parallel connected resistor R7 is such that when there is a break in power ringing the potential across capacitor C5 decreases to a level below the zener point of diode Z3 within a fraction of a second after a power ringing interruption. Thus, potential V2 is present on lead 16 while power ringing is present on leads T and R, and is absent from lead 16 within a fraction of a second after power ringing is removed from the leads. In this manner tone ringer 10 is periodically activated to provide the ringing and silent intervals like those of power ringing.

It is to be understood that the embodiment of my invention described herein is merely illustrative of the principles of the invention. Various modifications may be made thereto by persons skilled in the art without departing from the spirit and scope of the invention.

What is claimed is:

1. A telephone set tone ringer comprising
- a transducer responsive to electrical signals of audio frequency for producing audible tones,
- means for generating a plurality of first electrical pulses which are applied to said transducer and produce a like plurality of audible clicks, and
- a first oscillator responsive to each of said first pulses for providing an audio frequency signal pulse output which is also applied to said transducer to produce an audio tone pulse.

2. The tone ringer in accordance with claim 1 wherein said generating means comprise a second oscillator including a resistor and capacitor network having a time constant determining the frequency of said sequence pulses, the potential across said capacitor as it charges and discharges varying the amplitude of said audio frequency signal pulse.

3. A telephone tone ringer comprising
- a transducer responsive to electrical signals of audio frequency for producing audible tones,
- an audio oscillator for providing said electrical signals,
- capacitor means coupled to said oscillator and effective when charged at a relatively slow rate over a path through said oscillator for varying the amplitude of said electrical signal output from said oscillator, and
- means for discharging said capacitor means through said transducer means at a relatively fast rate to produce an audible click.

4. The tone ringer in accordance with claim 3 wherein said discharging means comprises a threshold device operable when said capacitor means is charged to a predetermined level to discharge said capacitor means through said transducer.

5. The tone ringer in accordance with claim 4 wherein said audio oscillator comprises a Wein Bridge Oscillator.

6. A telephone set tone ringer comprising,
- a transducer for converting electrical signals to audible sound,
- a relaxation oscillator including a resistor and capacitor for determining the frequency of operation of said relaxation oscillator, said capacitor charging at one rate through said resistor and then being discharged by said relaxation oscillator at a much faster rate through said transducer to produce an audible click, and
- a Wein Bridge audio oscillator connected to said relaxation oscillator via said resistor, the output level of said audio oscillator being decreased as said capacitor charges thereby causing said audio oscillator to generate pulses of audio oscillations at the same frequency as said relaxation oscillator, and the pulses output from said audio oscillator being applied via a transformer to said transducer to produce an audio tone pulse immediately following each said audible click.

7. The invention in accordance with claim 6 further comprising a power supply powered by interrupted power ringing applied to a telephone line to ring a subscriber telephone set, said power supply providing power to said tone ringer as to interrupt the tone ringing output by said transducer at the same rate said power ringing is interrupted.

8. A telephone tone ringer comprising,
- a transducer responsive to electrical
- signals of audio frequency for producing audible tones,
- an audio oscillator for providing said electrical signals,
- transformer means having a primary winding to which is applied said electrical signals from said audio oscillator and a secondary winding connected to said transducer, and
- oscillator means oscillating at a sub-audio frequency comprising, capacitor means coupled to said audio oscillator and effective when charged at a relatively slow rate therethrough to amplitude modulate said electrical signal output from said audio oscillator so that the audible tone created by said signal becomes inaudible, and a threshold device responsive to the potential across said capacitor means and operated when said capacitor means is charged to a predetermined level to rapidly discharge said capacitor means through said transducer and thereby produce an audible click.

* * * * *